United States Patent [19]

Kobayashi et al.

[11] 4,263,928

[45] Apr. 28, 1981

[54] FUEL SECURITY DEVICE

[75] Inventors: Toshiji Kobayashi, Takamori; Kazushige Hashimoto, Kamisato, both of Japan

[73] Assignee: Iida Sankyo Co., Ltd., Iida, Japan

[21] Appl. No.: 959,959

[22] Filed: Nov. 13, 1978

[30] Foreign Application Priority Data

Nov. 11, 1977 [JP] Japan .................. 52-134765

[51] Int. Cl.³ .......................................... F16K 17/36
[52] U.S. Cl. .................................... 137/39; 137/78.4;
  137/624.12; 251/129; 251/137; 361/154; 361/194
[58] Field of Search ............... 137/38, 39, 78 B, 78 C, 137/624.12; 251/129, 137; 361/154, 194

[56] References Cited

U.S. PATENT DOCUMENTS

| 1,325,048 | 12/1919 | Simon | 361/154 X |
|---|---|---|---|
| 2,611,643 | 9/1952 | Higgins | 251/129 X |
| 2,648,034 | 8/1953 | Douglas | 361/154 |
| 2,718,951 | 9/1955 | Mason | 361/154 X |
| 3,080,508 | 3/1963 | Hipple | 361/154 |
| 3,524,471 | 8/1970 | Bresser | 137/624.12 |
| 3,625,476 | 12/1971 | Meir | 251/129 |
| 3,906,294 | 9/1975 | Lourigan | 251/129 X |
| 4,065,096 | 12/1977 | Frantz | 251/137 X |
| 4,078,709 | 3/1978 | Jenkins | 361/194 |
| 4,098,284 | 7/1978 | Yamada | 137/39 |

Primary Examiner—Robert G. Nilson
Attorney, Agent, or Firm—Sughrue, Rothwell, Mion, Zinn and Macpeak

[57] ABSTRACT

A security device for a fuel such as natural gas having a series circuit of a relay switch, a hazard detecting switch, a relay switch operating coil and a timer. A valve coil is adapted to open and close a main fuel supply valve. The valve coil is connected in parallel to the series circuit. A reset switch is adapted to excite the valve coil and is connected in parallel with the relay switch. In one embodiment, the hazard detecting switch, the relay switch operating coil and the valve coil are coupled through a transformer in series with an electric source. The hazard detecting switch the relay switch operating coil and the valve coil are disposed on a secondary side of the transformer. The main fuel supply valve is normally closed such that in case of a power failure, the valve will close and remain closed.

11 Claims, 9 Drawing Figures

FUEL SECURITY DEVICE

BACKGROUND OF THE INVENTION

This invention relates to a security device for fuel which comprises a timer and a control circuit to close the main valve of a fuel pipe in the case where hazardous conditions exist as in the leakage of fuel due to a crack of the fuel pipe or in the occurrence of an earthquake. The control circuit will also periodically close the main valve at a time instant set by the timer in the case where no hazardous conditions exist, thereby to eliminate any occurrence of dangerous fuel problems.

Recently, the network for supplying gas fuel has increased and a variety of gas utensils are extensively used by consumers. Also, the gas tightness of houses has been improved by insulation, weather stripping and the like. Accordingly, dangerous problems such as gas poisoning and gas explosion caused by gas leakage may frequently occur. In order to prevent such disasters, there has been proposed in the prior art a gas leakage alarm device which provides an alarm signal in response to the leakage of gas and a security device which operates to close the main valve in the case where hazardous conditions exist. Typical are the leakage of gas or the occurrence of an earthquake. However, these devices operate only when such hazardous conditions occur. Accordingly, even if such an alarm device is used, the dangerous condition may still occur unless the user closes the main valve after receiving the alarm signal. Furthermore, even if the security device is installed, in the case of the leakage of gas in a generally gas-tight house at night, the occupants will not sense the problem when they are asleep. Thus, the conventional security device is not complete in all aspects of safety.

SUMMARY OF THE INVENTION

Accordingly, in view of the foregoing difficulties, an object of this invention is to provide a security device for fuel, such as gas, and which operates to close the main fuel supply valve by means of hazard detecting switches operated in response to hazardous conditions.

It is another object of this invention to automatically and periodically close the main valve during the period of time in which no fuel is normally required.

Yet another object of this invention is to provide a security device that is completely effective and reliable, yet versatile in operation.

These and other objects of this invention are attained using a series circuit comprising a relay switch, a hazard detecting switch, a relay switch operating coil and a timer switch connected to an electric source. A coil of a main shut-off valve is connected in parallel to the series circuit, and a reset switch adapted to excite the coil of the main shut-off valve is connected in parallel to the relay switch.

This invention will now be described with reference to its embodiments shown in the accompanying drawings.

BRIEF DESCRIPTION OF THE DRAWINGS

The accompanying drawings are diagrams used for a description of examples of a security device for fuel according to this invention.

More specifically.

DESCRIPTION OF THE PREFERRED EMBODIMENTS

Figure 1:
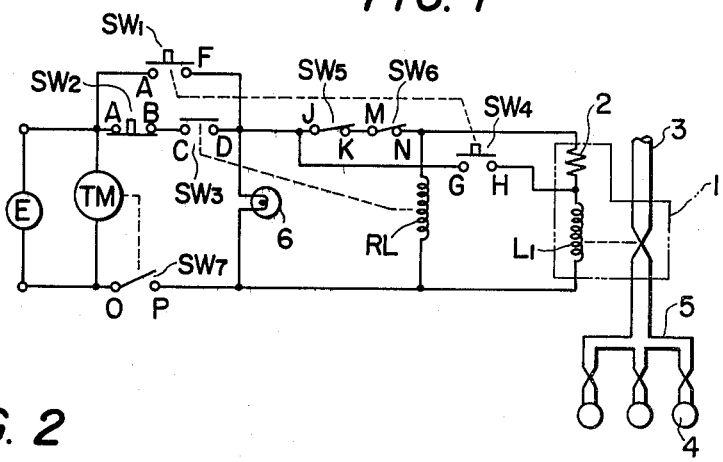
FIG. 1 is a circuit diagram showing a first example of the security device according to the invention.

A security device for fuel such as gas is as shown in FIG. 1. A timer motor TM, is connected to an electric source E and is operated at all times. Connected to one terminal of the electric source E are one terminal A of a reset switch SW1 and one terminal A of a circuit "off" switch SW2. A terminal B of the circuit "off" switch SW2 is connected to one terminal C of a relay switch SW3, a terminal D of which is connected to a terminal F of the reset switch SW1.

The terminals D and F of the switches SW1 and SW3 are connected to a terminal G of an attracting switch SW4 of a coil L1 and a terminal J of a gas leakage detecting switch SW5. A terminal H of the attracting switch SW4 is connected to the coil L1 of the main valve 1.

The gas leakage detecting switch SW5 is connected in series with an earthquake detecting switch SW6, a terminal N of which is connected to a terminal of an attraction holding resistor 2 of the main valve 1 and to a relay switch operating coil RL. The other terminal of the attraction holding resistor 2 is connected to the valve coil L1. The other terminals of the valve coil L1 and relay switch operating coil RL are connected to one terminal P of a timer switch SW7 which is operated (on and off) by the timer motor TM. A terminal O of the timer switch SW7 and the other terminal of the timer motor TM are connected to the other terminal of the electric source E.

The reset switch SW1 and the attracting switch SW4 are normally-open switches, and are operated in association with each other. The circuit "off" switch SW2 is a normally-closed switch. The gas leakage detecting switch SW5 and the earthquake detecting switch SW6, which are the hazard detecting switches, are normally-closed switches forming an OR circuit. The relay switch SW3 is a normally-open switch. The timer switch SW7 is set to selectively open and close in a period of 24 hours. The open period of time of the timer switch SW7 can be set-up as described.

The ends of the main valve 1 are connected respectively to a gas flow pipe 3 and to a piping 5 of gas utensils 4. The main valve 1 is a normally-closed valve. A pilot lamp 6 is connected between the other terminal D of the relay switch and one terminal P of the timer switch SW7. The attracting switch SW4 may be so designed that it is operated by the valve coil L1 in such a manner that it is opened when the main valve 1 is opened and it is closed when the main valve 1 is closed.

The operation of the fuel security device thus constructed will now be described. The period of time during which the timer switch SW7 is opened is set to the period of time during which no gas is normally used (hereinafter referred to as "a gas non-use time period" when applicable) because the user is asleep or absent for a protracted period. It is assumed that the gas non-use time period is about 6 hours from 12 o'clock p.m. to 6 o'clock a.m. next morning in the case of a daily routine.

If the reset switch SW1 is depressed during the gas use time period from 6 o'clock a.m. to 12 o'clock p.m., then the attracting switch SW4 is closed in association with the depression of the reset switch SW1. The closure of the switches SW1 and SW4 causes the valve coil L1 of the main valve 1 to be energized, as a result of which the valve 1 is opened to supply gas to the gas utensils 4. Furthermore, the relay switch operating coil RL is energized by the closure of the switch SW1, as a result of which the relay switch SW3 is closed, and therefore the relay switch operating coil RL is maintained energized even if the depression of the reset switch SW1 is released. Accordingly, a current is supplied through the circuit "off" switch SW2, the relay switch SW3, the gas leakage detecting switch SW5, the earthquake detecting switch SW6 and the attraction holding resistor 2 to the valve coil L1 of the main valve 1 opened through attraction. This will maintain the main valve 1 open.

Figure 2:
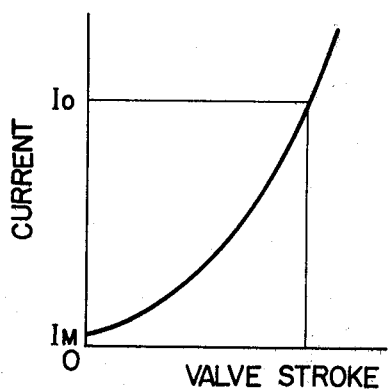
FIG. 2 is a graphical representation indicating the relationships between the operation of an electromagnetic valve and the current.

In general, as shown in FIG. 2, an electromagnetic valve requires a large current $I_0$ for attraction according to the valve stroke, but after being attracted, the electromagnetic valve can be maintained attracted with a small attracting current. Therefore, a holding current $I_M$ is allowed to flow through the attraction holding resistor 2. In this case, the pilot lamp 6 is turned on.

When a hazardous condition occurs, for example when the gas piping is cracked or an earthquake occurs, either of the hazard detecting switches SW5 or SW6 is opened to suspend the application of current to the valve coil L1 of the main valve 1. As a result, the main valve is closed, so that the supply of gas to the piping 5 is stopped and the pilot lamp 6 is turned off.

In the case of service interruption also, the relay switch SW3 is opened to close the main valve. The main valve 1, once closed, cannot be opened unless the reset switch SW1 and the attracting switch SW4 are closed by depression. If this security device is provided for a group of houses or an apartment house, the main valves of all the houses or rooms can be closed by interrupting the electric source. Therefore, the security device can be effectively used for the collective control of gas security. Furthermore, if the earthquake detector is provided on a gas tank or a collective control tower and the electric source of the security device is interrupted, the main valves in all the houses or rooms can be collectively controlled.

If the user wants to close the main valve 1 before he goes away from his house for instance, the circuit off switch SW2 should be opened by depression. In this case, the relay switch operating coil RL and the valve coil L1 of the main valve 1 are deenergized, and therefore the main valve 1 is closed. When the main valve 1 is to again be opened during the gas use time period, the reset switch SW1 and the attracting switch SW4 are depressed.

During the period of time when the timer is not used (hereinafter referred to as "a timer non-use period," when applicable), the timer switch SW7 is opened. As a result, the relay switch operating coil RL and the valve coil L1 of the main valve 1 are deenergized, the pilot lamp 6 is turned off, and the main valve 1 is closed.

When the reset switch SW1 is depressed, during the period of time during which the timer is used, for example, the next morning, the attracting switch SW4 and the relay switch SW3 are closed. As a result, the main valve 1 is opened. If it is required to use gas during the above-described gas non-use time period, it is necessary to change the timer period of time and to depress the reset switch SW1.

The above-described electric source E may be the commercial power supply or a battery electric source. A synchronous motor or a step motor is employed as the timer motor TM according to the electric source employed. The timer is designed so that the gas non-use time period can be changed within a range of from two hours to eight hours for instance, as desired by the user.

Figure 3:
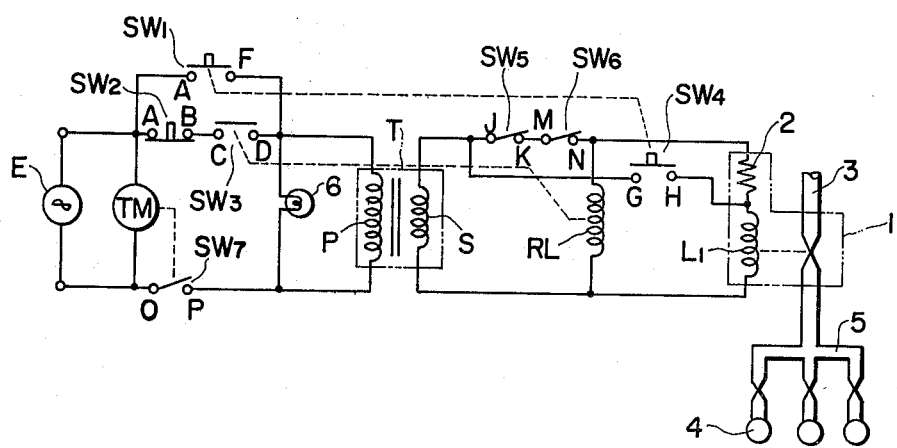
FIG. 3 is a circuit diagram showing a second example of the security device in which the starting side is separated by a transformer from the operating side.

FIG. 3 shows another example of the security device in which the starting side is separated by a transformer T from the operating side. One terminal of a primary winding P of the transformer T is connected through a reset switch SW1 and a series circuit of a circuit "off" switch SW2 and a relay switch SW3 to one terminal of an electric source E. The other terminal of the primary winding P is connected to the other terminal of the electric source E through a timer switch SW7. A timer motor TM, connected directly to the electric source E, is operated at all times. A pilot lamp 6 is connected in parallel to the primary winding P.

One terminal of a secondary winding S of the transformer T is connected to a terminal J of a gas leakage detecting switch SW5, which is a hazard detecting switch, and to a terminal G of an attracting switch SW4. The other terminal K of the gas leakage detecting switch SW5 is connected to a terminal M of an earthquake detecting switch SW6, which is another hazard detecting switch. The other terminal N of the earthquake switch is connected to one terminal of an attraction holding resistor 2 and one terminal of a relay switch operating coil RL.

A terminal H of the attracting switch SW4 and the other terminal of the attraction holding resistor 2 are connected to one terminal of a valve coil L1 of the main valve 1. The other terminals of the valve coil L1 and relay switch operating coil RL are connected to the other terminal of a secondary winding S of the transformer T. The main valve 1 is connected to a gas supply pipe 3 and a piping 5.

The operation of the security device shown in FIG. 3 is similar to that of the security device shown in FIG. 1. A primary winding P of the transformer T is energized by depressing the reset switch SW1. As a result, a voltage is developed across the secondary winding S of the transformer T. Therefore, a current is applied through the hazard detecting switches, or the gas leakage detecting switch SW5 and the earthquake detecting switch SW6, to the relay switch operating coil RL and to the attraction holding resistor 2 and the valve coil L1 of the main valve 1. Since a current has been applied to the valve coil L1 through the attracting switch SW4 closed in association with the depression of the reset switch SW1, the main valve 1 is maintained open by a small current $I_M$ supplied through the hazard detecting switches and the attraction holding resistor 2.

The relay switch SW1 connected in parallel to the reset switch on the primary winding side of the transformer T is closed by the operation of the relay switch operating coil RL. Therefore, the supply of current to the transformer T is maintained continued even if the depression of the reset switch SW1 is released. In the security device shown in FIG. 3, the main valve 1 is closed when the supply of current is suspended by the operation of the hazard detecting switches, by the depression of the circuit off switch SW2, or by the opening of the timer switch SW7 during the gas non-use time period. The operating side of the security device can operate at a low voltage even if the voltage of the electric source E is high. Therefore, for instance potential problems such as electric shock caused by the leakage of high voltage into gas utensils can be prevented. Hence overall security of the system is improved. In addition, since the relay switch SW3 is provided on the primary winding side of the transformer T and the relay switch operating coil RL is provided on the secondary winding side S of the transformer T, the current flowing in the primary winding side of the transformer T is interrupted when the main valve 1 is closed. This is advantageous in view of power consumption and security.

Figure 4:
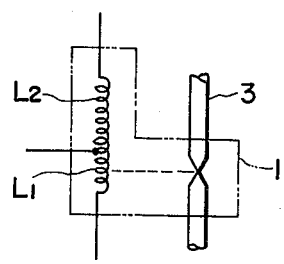
FIG. 4 is an explanatory diagram showing a main valve provided with an attracting valve coil and an attraction holding valve coil.

As shown in FIG. 4, main valve 1 is provided with an attracting valve coil L1 and an attraction holding valve coil L2. When the main valve 1 is to be closed, a large current is allowed to flow in the attracting valve coil L1 to attract the main valve 1. The main valve thus attracted is maintained as it is by feeding a small current to a series circuit of the attracting valve coil L1 and the attraction holding coil L2. The same effect can be obtained by allowing a large current and a small current to flow respectively in an attracting valve coil L1 and an attraction holding valve coil L2 provided separately for the main valve 1.

FIG. 5 through 9 shows modifications of the security devices illustrated in FIGS. 1 and 3.

Figure 5:
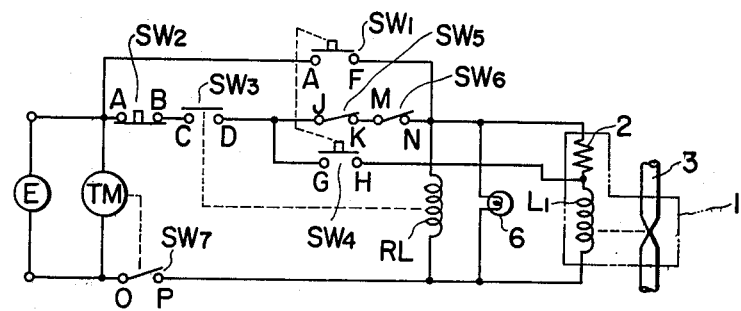
FIG. 5 through FIG. 8 are circuit diagrams showing various modifications of the security device shown in FIG. 1.

In the security device shown in FIG. 5, the reset switch SW1 is connected in parallel to the series circuit comprising the circuit off switch SW2, the relay switch SW3, and the hazard detecting switches, or the gas leakage detecting switch SW5 and the earthquake detecting switch SW6. The attracting switch SW4 is connected to terminal D of the relay switch SW3. The relay switch operating coil RL and the pilot lamp 6 are connected between terminal F of the reset switch SW1 and terminal P of the timer switch SW7. An important aspect of this security device resides in that when the security device is started, current is applied directly to the relay switch operating coil RL by closing the reset switch SW1.

Figure 6:
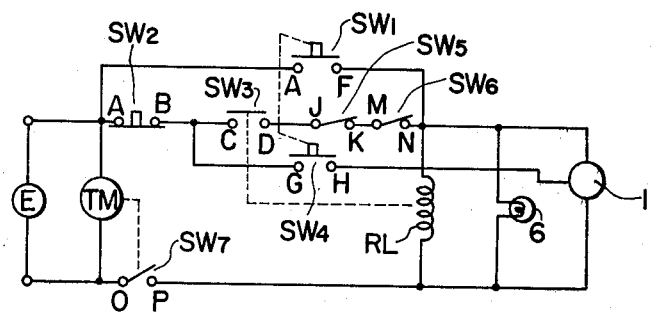

A security device shown in FIG. 6 is different from that shown in FIG. 5 in that the attracting switch SW4 is connected to terminal C of the circuit off switch SW2.

Figure 7:
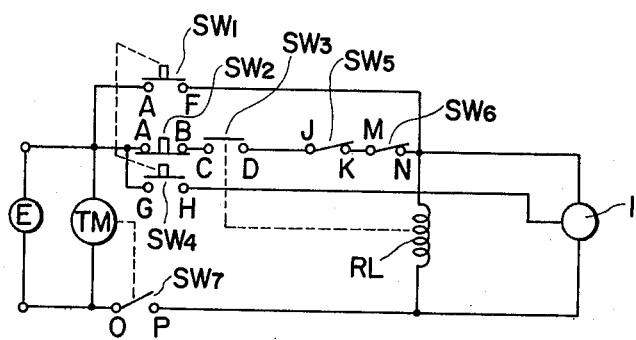

A security device shown in FIG. 7 is different from that shown in FIG. 5 or 6 in that the attracting switch SW4 is connected to terminal A of the circuit "off" switch SW2, i.e. the electric source E. In the security device of FIG. 8, the reset switch SW1 is connected in parallel to a series circuit comprising the circuit "off" switch SW2 and the relay switch SW3 and to the electric source E. Terminal F of the reset switch SW1 is connected to the hazard detecting switches SW5 and SW6, to the attracting switch SW4 and to the attraction holding switch SW2. The series circuit of the hazard detecting switches SW5 and SW6 is connected through the relay switch operating coil RL to terminal P of the timer switch SW7. Terminal H of the attracting switchg SW4 is connected through the valve coil L1 of the main valve 1, to the terminal P of the timer switch SW7. The attraction holding resistor 2 is connected to the valve coil L1.

Thus, only the current of the relay switch operating coil RL flows in the gas leakage detecting switch SW5 and the earthquake detecting switch SW6 which are the hazard detecting switches. Therefore, the current capacity of the hazard detecting switches SW5 and SW6 can be reduced.

Figure 8:
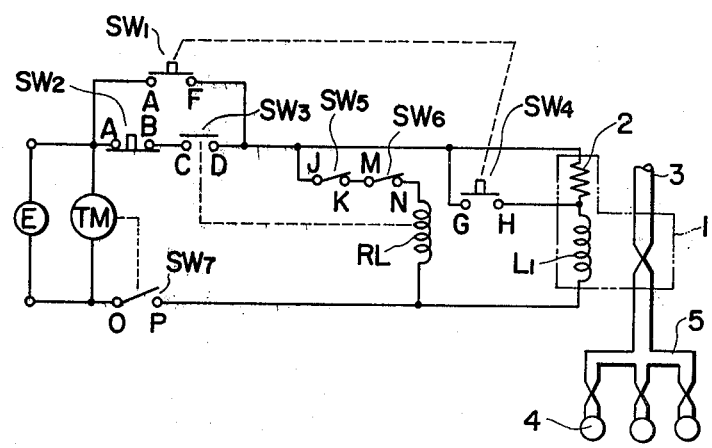
Figure 9:
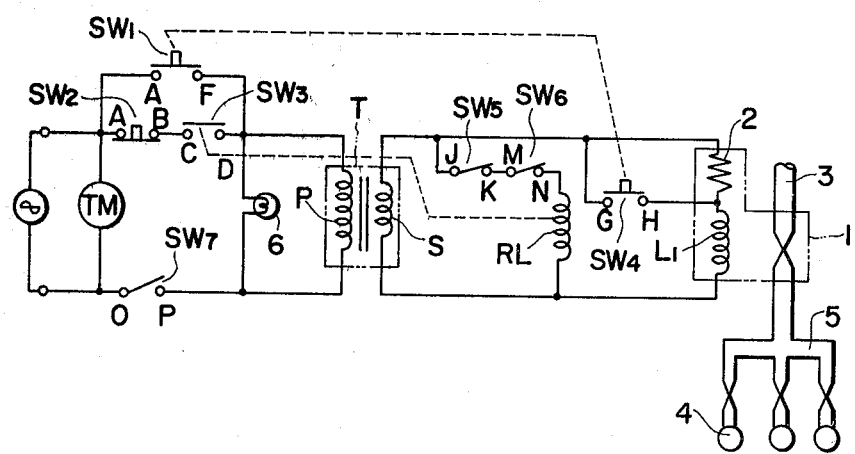
FIG. 9 is a circuit diagram showing one modification of the security device shown in FIG. 3.

A security device shown in FIG. 9 is different from that shown in FIG. 8 in that the main valve operating side is connected through the transformer T to the electric force E, and that the relay switch SW3 is provided on the side of the primary winding P of the transformer T and the relay switch operating coil RL is provided on the side of the secondary winding S of the transformer T.

This invention has been described with reference to the case where the fuel is gas; however, the technical concept of the invention can be applied to other fluid fuels.

In the security device constructed as described above, if the gas non-use time period is set in accordance with the user's living pattern or business pattern, the gas main valve is automatically closed after he goes to sleep or his office is closed, thereby preventing difficulties due to leakage of gas. That is, a problem that it requires to closing the main valve manually whenever the user goes to sleep or leaves his office, can be eliminated.

The commerical electric supply is utilized to operate (open and close) the main valve. However, since the normally-close type main valve and the normally-open-relay-switch are employed, even if the supply of current is started again after the interruption of service, the main valve is not opened, because the relay switch interrupts the supply of current to the circuit where the supply of current is started after the gas main valve has been closed. Furthermore, in the case where the security device is employed for a group of houses or an apartment house, the main valves in all the houses or rooms can be closed by temporarily suspending the supply of current from the electric source. Therefore, the security device can be effectively used for collectively used for collective control of the use of gas.

In addition, with the security device according to the invention, the main valve is periodically closed during the gas non-use time period and therefore, a control system for preventing gas leakage problems can be established in the case where no hazardous conditions exist as well as the case where hazardous conditions exist. Thus, the security device for fluid fuel having the above-described excellent merits can be provided according to the invention.

We claim:

1. A security device for a fluid fuel comprising: a main supply valve in a fluid fuel pipe; a series circuit having a source of electric power, a relay switch, a hazard detecting switch, a relay switch operating coil for said relay switch, and a timer switch connected in series; a valve coil adapted to open and close said main supply valve and connected in parallel to said series circuit; and a reset switch adapted to excite said valve coil and connected in parallel to said relay switch.

2. A security device as claimed in claim 1, further comprising a transformer coupled to said source of electric power; said hazard detecting switch, relay switch operating coil and valve coil being connected through said transformer in series with said electric source; and said hazard detecting switch, relay switch operating coil and valve coil are provided on the secondary side of said transformer.

3. A security device as claimed in claim 2, wherein said relay switch for said relay switch operating coil is connected to the primary side of said transformer.

4. A security device as claimed in claim 1, in which said main supply valve of said fluid fuel pipe is of a normally closed type.

5. A security device as claimed in claim 1, in which the time at which said timer switch is closed is selectively set.

6. A security device as claimed in claims 1 or 5 wherein the time for closure of said timer switch is during a time interval of fuel use.

7. A security device as claimed in claim 1 further comprising a pilot light in parallel with said source of electric power and in series with said reset switch.

8. A security device as claimed in claims 1 or 2 wherein said hazard detecting switch comprises a plurality of detecting switches in series, said detecting switches including a gas leakage detecting switch.

9. A security device as claimed in claims 1 or 2 further comprising a circuit cut-off switch disposed in series with said source of electric power and said relay switch.

10. A security device as claimed in claim 1 or 2 further comprising an attracting switch in series between said source of electric power and said main supply valve coil, said attracting switch being ganged to said reset switch.

11. A security device as claimed in claim 2 further comprising an attracting switch in series between said source of electric power and said main supply valve coil, said attracting switch being ganged to said reset switch, and wherein said attracting switch is on the secondary side of said transformer.

* * * * *